United States Patent
Chen (10) Patent No.: US 11,311,351 B2
(45) Date of Patent: Apr. 26, 2022

(54) PATIENT-SPECIFIC TRAY FOR ORTHODONTIC VIBRATIONAL FORCE MANAGEMENT

(71) Applicant: Jie Chen, Carmel, IN (US)

(72) Inventor: Jie Chen, Carmel, IN (US)

(73) Assignee: CREATIVE ESP INCORPORATED, Carmel, IN (US)

( * ) Notice: Subject to any disclaimer, the term of this patent is extended or adjusted under 35 U.S.C. 154(b) by 216 days.

(21) Appl. No.: 16/503,918

(22) Filed: Jul. 5, 2019

(65) Prior Publication Data

US 2020/0069395 A1 Mar. 5, 2020

Related U.S. Application Data

(60) Provisional application No. 62/726,533, filed on Sep. 4, 2018.

(51) Int. Cl.
*A61C 7/00* (2006.01)
*A61C 7/36* (2006.01)

(52) U.S. Cl.
CPC ............... *A61C 7/008* (2013.01); *A61C 7/36* (2013.01)

(58) Field of Classification Search
CPC .. A61C 7/00; A61C 7/008; A61C 7/08; A61C 7/36
USPC ........................................ 433/13, 6, 18, 118
See application file for complete search history.

(56) References Cited

U.S. PATENT DOCUMENTS

| | | |
|---|---|---|
| 4,244,688 A | 1/1981 | Kurz |
| 4,348,178 A * | 9/1982 | Kurz ..................... A61C 7/008 433/5 |
| 5,030,098 A | 7/1991 | Branford |
| 5,967,784 A | 10/1999 | Powers |
| 6,632,088 B2 | 10/2003 | Voudouris |
| 6,832,912 B2 | 12/2004 | Mao |
| 7,029,276 B2 | 4/2006 | Mao |
| 8,500,446 B2 | 8/2013 | Lowe |
| 8,636,506 B2 | 1/2014 | Pavlin |
| 8,708,701 B2 | 4/2014 | Levens et al. |
| 8,851,887 B1 | 10/2014 | Ostreicher |
| 8,939,762 B2 | 1/2015 | Lowe |

(Continued)

FOREIGN PATENT DOCUMENTS

JP 4171743 B2 * 10/2008

OTHER PUBLICATIONS

Kajimoto et al., JP 4171743 B2, Machine translation of the specification, (Year: 2008).*

*Primary Examiner* — Nicholas D Lucchesi
*Assistant Examiner* — Mirayda A Aponte
(74) *Attorney, Agent, or Firm* — Piroozi-IP, LLC (57) ABSTRACT

A device for accelerating tooth movement under orthodontic treatment is disclosed. The device includes a vibrational source and a patient-specific tray. The device applies vibrational forces with prescribed frequency and intensity to the teeth under orthodontic treatment with traditional appliances, such as bracket-wire system or aligner. The patient-specific tray ensures the vibrational stimulations on the teeth to be moved. The level of stimulation intensity can be controlled by varying the preload on each of the teeth based on the clinician's prescription. The tray can be further modified to ensure continuous delivery of the desired vibrational forces on the teeth when they move during the treatment.

1 Claim, 5 Drawing Sheets

(56) References Cited

U.S. PATENT DOCUMENTS

| | | |
|---|---|---|
| 9,028,250 B2 | 5/2015 | Spaulding et al. |
| 9,370,405 B2 | 6/2016 | Lowe |
| 9,662,184 B2 | 5/2017 | Lowe |
| 9,700,384 B2 | 7/2017 | Lowe |
| 9,848,959 B2 | 12/2017 | Lowe et al. |
| 9,943,380 B2 | 4/2018 | Lowe |
| 9,968,421 B2 | 5/2018 | Bowman et al. |
| 10,039,617 B2 | 8/2018 | Lowe et al. |
| 10,085,822 B2 | 10/2018 | Way et al. |
| 10,092,374 B2 | 10/2018 | Yamamoto et al. |
| 10,111,729 B1 | 10/2018 | Lowe et al. |
| 2009/0061379 A1* | 3/2009 | Yamamoto ............... A61C 7/08 433/24 |
| 2012/0040300 A1* | 2/2012 | Levens ................ A61C 7/008 433/5 |
| 2013/0252193 A1* | 9/2013 | Bowman ............... A61C 7/008 433/6 |
| 2014/0080082 A1* | 3/2014 | Lowe .................... A61C 7/008 433/6 |

\* cited by examiner

PATIENT-SPECIFIC TRAY FOR ORTHODONTIC VIBRATIONAL FORCE MANAGEMENT

CROSS-REFERENCE TO RELATED APPLICATIONS

The present patent application is related to and claims the priority benefit of U.S. Provisional Patent Application Ser. No. 62/726,533 filed 4 Sep. 2018, the contents of which are hereby incorporated by reference in its entirety into the present disclosure.

FIELD OF DISCLOSURE

The present disclosure relates to a device for supplementing existing orthodontic treatments to effectively accelerate tooth movement in orthodontic treatments using vibrational force.

BACKGROUND OF THE DISCLOSURE

In orthodontic treatment, clinicians develop treatment plans that include moving certain teeth and keeping others stationary or minimally moved. Orthodontic appliances, such as bracket-wire system and aligner, are commonly used to execute the treatment. To shorten the treatment time, accelerating the movement of the teeth to be moved and securing the anchorage tooth to be stationary are in high demand, which benefits both clinicians and patients.

Most orthodontic treatments require moving specific teeth at different speeds, thus differential tooth movement is desired. Certain teeth are to be moved and desired to move fast; and some serve as anchorage and are expected to have minimum movement.

Vibrational force with certain frequency and intensity stimulates bone modeling and remodeling. Once combined with orthodontic force, it enables accelerated tooth movement. Without orthodontic force, it strengthens the tooth's surrounding bone. Commercial vibrational devices, such as AcceleDent from OrthoAccel or VPro5 from Propel, intend to accelerate tooth movement by delivering vibrational force with certain frequency and intensity to the teeth under traditional orthodontic treatment, such as bracket-wire system and aligner. The device intends to supplement these traditional treatments for shortening the treatment time. These devices consist of a vibrational source and a tray (mouthpiece) that is placed in between the upper and lower teeth in an occlusal position. The device applies a vibrational force to the patient's teeth through the tray to accelerate tooth movement.

The tooth's response depends on the intensity of the stimulation, which is characterized by the peak load of the vibrational force. There is an intensity range. The stimulation outside the range may either have no effect if the stimulation is too low or damage the tissue if the stimulation is too high, causing adverse outcomes. This phenomenon can be used for orthodontic treatment. In the clinic, the tooth to be moved needs more stimulation and the anchorage teeth need the minimum. However, the devices of the prior art do not provide the selective control for providing the needed stimulation.

The generic trays in the current products do not allow this level of control. Clinical treatment requires applying the vibrational stimulation on the tooth to be moved with specified intensity. The major issue of the current products is that they cannot guarantee the delivery of the correct stimulations to the specified teeth to be moved.

Figure 2A:
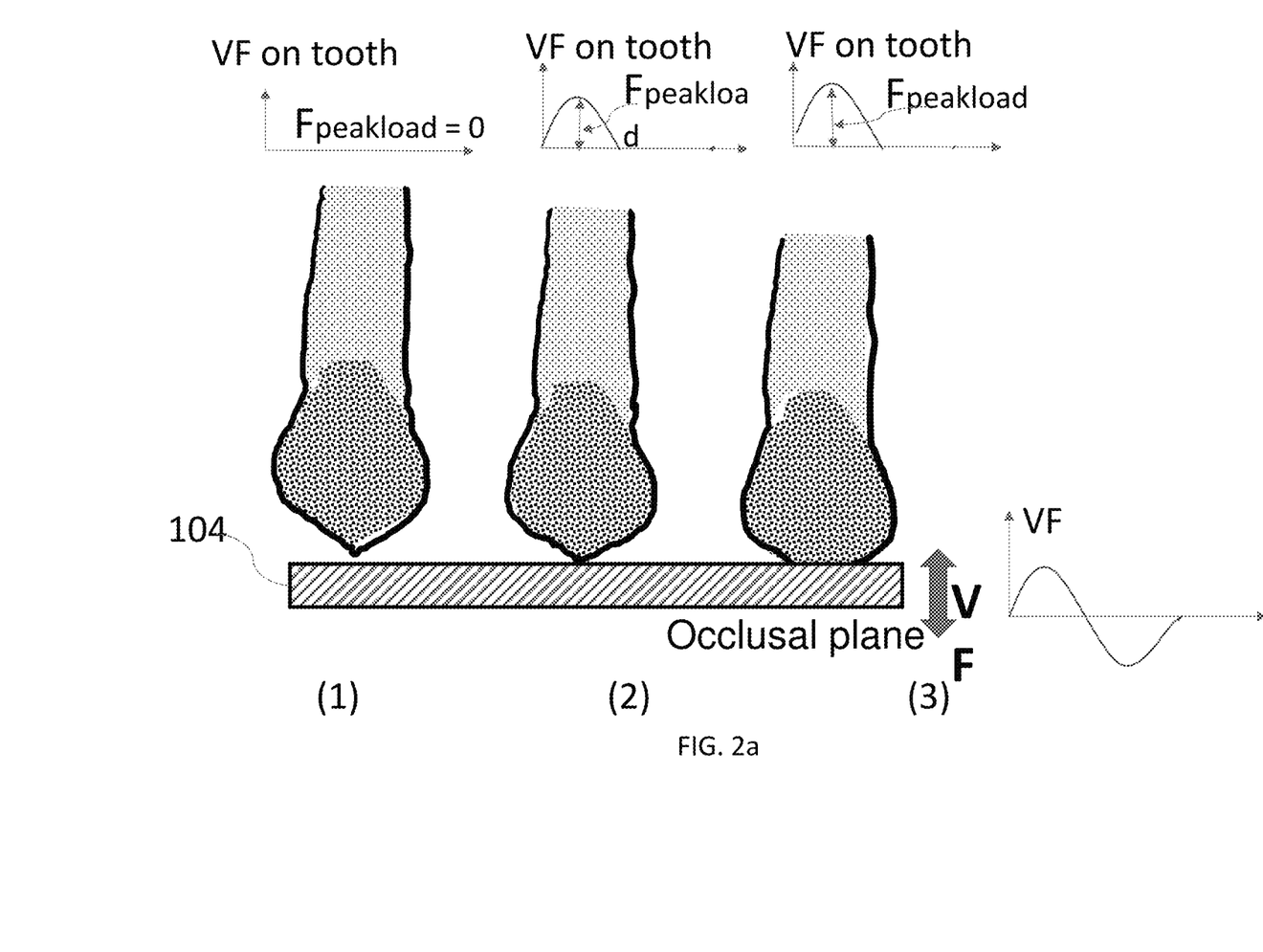
FIGS. 2a and 2b are schematics of three teeth with the tray of FIG. 1 in one case with improper contact to the tray (FIG. 2a) and in another case with proper contact to the tray (FIG. 2b).
Figure 2B:
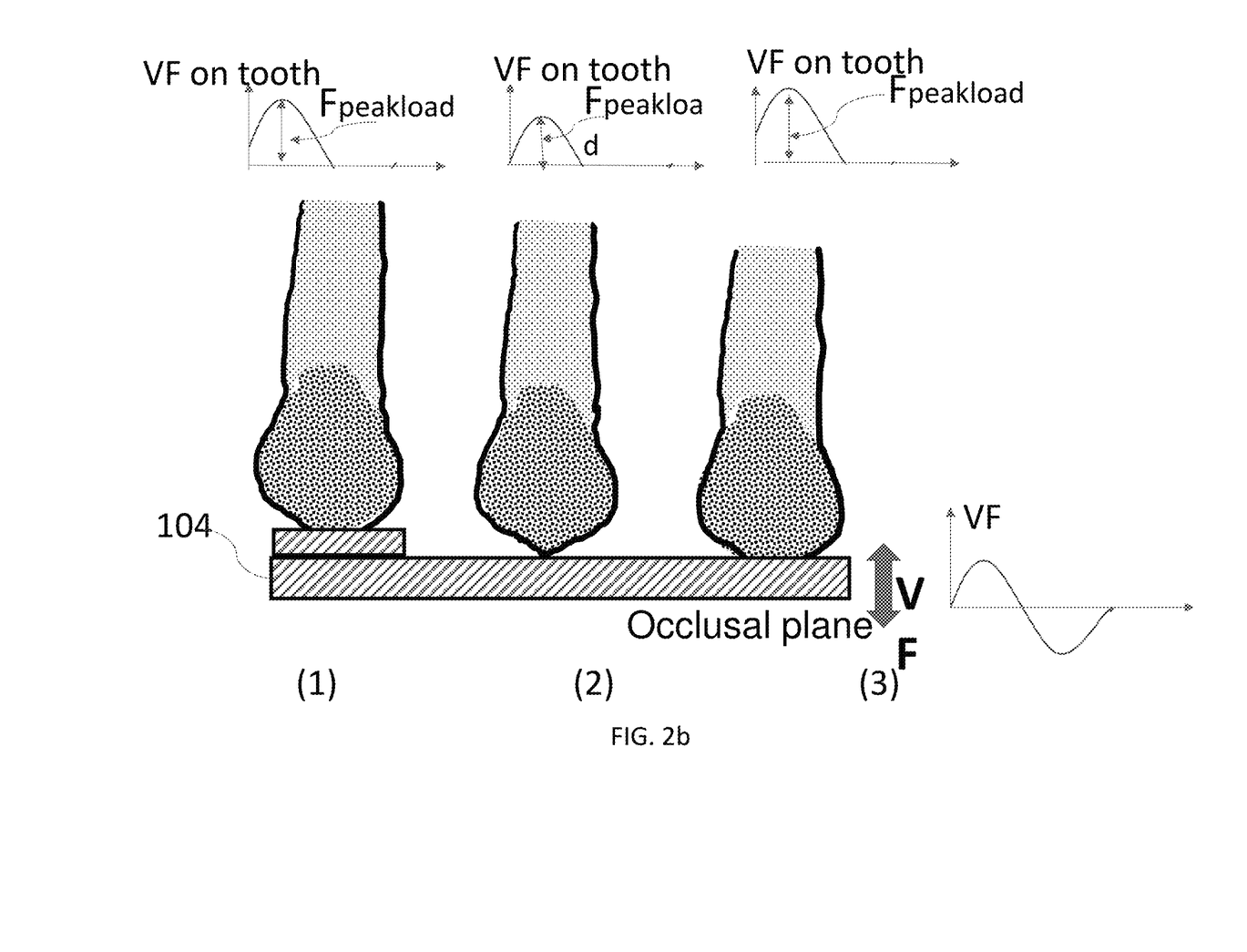

The accelerated tooth movement relies on the level of stimulation (or intensity) of the vibrational force characterized by its peak load the tooth receives. First, the tooth needs to be in contact with the tray to receive the stimulation. Without the contact, the force cannot be transmitted to the tooth. Second, the level of the vibrational force intensity on the tooth depends on the level of vibrational force delivered from the vibrational source and the pre-load on the tooth when biting on the tray. When a patient bites on the tray during the treatment, due to uneven extrusion of the crowns, a tooth may 1) have no contact to the tray; 2) contact the tray; or 3) contact with pre-compression (pre-load) caused by its over-extrusion relative to the neighboring teeth, see in FIG. 2. Therefore, the amount of stimulation or peak load relies on the initial condition between the tooth and the tray. The case 1 results in no force to be transmitted to the tooth. The case 2 stimulates the tooth from zero to the peak load of the vibrational force from the source. The case 3 applies a preload to the tooth so that the stimulating peak load will be the preload plus the vibrational peak force. To ensure that a tooth receives certain level of stimulation, the tooth needs to contact the tray and with certain preload.

The current vibrational device cannot guarantee delivery of the desired stimulations to the teeth due to the following three main reasons: 1) inability to guarantee delivery of the vibrational force to the specified tooth/teeth; and 2) inability to control the stimulation intensity on the targeted tooth/teeth. The first aspect is due to lack of control of contact between the teeth to be moved and the tray. The patients' crown profiles are different. Some teeth extrude more than others. The current tray design is generic, which is for all patients. It does not adapt to patients' teeth occlusal profile. With the current generic tray designs, when a patient bites down on the tray, the tooth to be moved is not guaranteed to contact the tray, thus may not receive any vibrational force.

The second aspect is related to the control of the vibrational force intensity (peak load). The tooth/teeth to be moved need high intensity while these serve as anchorage or not to be moved should have minimum intensity. Naturally, the occlusal profile of the teeth are not uniform. With the current device, the intensity is also not controllable because, due to uneven occlusal tooth profile. Some teeth may contact to the tray earlier if it extrudes more than others. These teeth, which may not be these to be moved, will have more peak load than others. The more pre-load the tooth experience, the higher the experienced force. However, some teeth may not even contact the tray because of their intruded positions, which result in no vibrational force applied even though they are intended to be moved. Therefore, for a flat tray, stimulations on these teeth are not controllable, which result in inability to guarantee delivering the desired stimulation to the specific teeth. Without the adequate stimulation, the clinical treatment intention will not be realized, causing inconsistent treatment outcomes.

Furthermore, the level of stimulation depends on whether the tray can deliver the vibrational force to the teeth. The vibrational force is delivered to the teeth through the tray. The level of force on an individual tooth depends on the stiffness of the tray and the tooth location. The peak loads on the molars and incisors are much higher than on the canine and premolars. This is another factor that results in inconsistency of the treatment.

Because of these, the existing vibrational force (VF) devices do not guarantee delivery of the stimulation nor control the level of stimulation. Inconsistent treatment effects have been widely reported, which resulted in uncertainty of its efficacy. Therefore, in view of the above, in VF orthodontic therapy there is an unmet need for a device that ensures delivery of desired VF intensity onto teeth that are to be moved.

SUMMARY OF THE DISCLOSURE

The present disclosure describes a vibrational device that comprises a vibrational source and an individualized tray. The device is patient specific, used therein for accelerating tooth movement of the patient under an orthodontic treatment. The fundamental requirement is to ensure the delivery of desired vibrational force intensity on individual tooth from a treatment plan, thus the tooth movement speed can be controlled. In one embodiment, the device includes a vibrational source that can generate vibrational force with prescribed frequency and magnitude, and a customized tray that has the patient's occlusal profile from sources including the patient's computed tomography (CT) images or occlusal registration. The occlusal profile will be added to the patient-specific tray and will be modified by introducing interference or clearance based on the desired level of stimulation on individual tooth. The stimulation level is related to the desired speed of tooth movement, which is prescribed from the treatment plan. The teeth will move during the treatment. Our device will allow the teeth move into the positions as prescribed. For the tooth to be moved, we will create a groove originated from its crown profile's initial position on the tray in the direction of the tooth movement parallel to the occlusal plane based on the clinician's intention. The groove will be wide enough to accommodate possible tooth displacement deviations. When a tooth moves into the groove, it will maintain its contact with the tray and to be stimulated. In case the peak load needs to be adjusted due to the tooth's intrusion or extrusion during the treatment, a layer of the materials, such as silicon, can be added to the bottom of the groove for intruded tooth or a layer of the material at the bottom of the groove can be removed for the extruded tooth. The thickness of the addition or removal can be computed or experimentally obtained.

During the treatment, the tray will be attached to the vibrational source. The patient will be instructed to align the teeth to the occlusal profile on the tray and bite on it with a minimal force for holding the tray in the occlusal position. Once the device is turned on, the vibrational force generated by the source will be applied to the teeth through the patient-specific tray. The tooth with an interference will experience high peak load; with a clearance will experience less peak load or no peak load depending on the level of clearance. The innovative patient-specific tray will allow the clinicians to choose selectively the teeth to be stimulated at within a predetermined intensity range and ensure that only the intended teeth get the vibrational stimulation.

BRIEF DESCRIPTION OF THE DRAWINGS

The features of this invention, and the manner of attaining them, will become more apparent and the invention itself will be better understood by reference to the following description of embodiments of the invention taken in conjunction with the accompanying drawings. In the figures, like reference numerals represent like elements, and the figures are to be understood as illustrative of the disclosure. The figures are not necessarily drawn to scale and are not intended to be limiting in any way.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to be accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

A novel solution is presented in VF orthodontic therapy based on a device that delivers desired vibrational force (VF) intensity onto teeth that are to be moved. The presented solution is to replace a generic tray by a patient-specific tray. This invention is to develop a patient-specific dental tray for an individual patient. The invention has three distinct features: 1) It ensures contacts of the teeth intended to be moved with the dental tray so that these teeth will be stimulated. 2) It enables adjustment of the level of stimulation by adjusting the pre-load on the crown. And 3) It allows an individual tooth intended to be moved to move during the treatment while still being stimulated. The patient-specific tray will enable adjusting level of stimulation on an individual tooth based on a treatment plan so that differential tooth movement can be accomplished. It should be appreciated that the patient-specific tray of the present disclosure is intended to be a supplementary treatment for a principal orthodontic treatment based on retainers, braces, form-factor braces, or other orthodontic procedures, known to a person having ordinary skill in the art.

Figure 1:
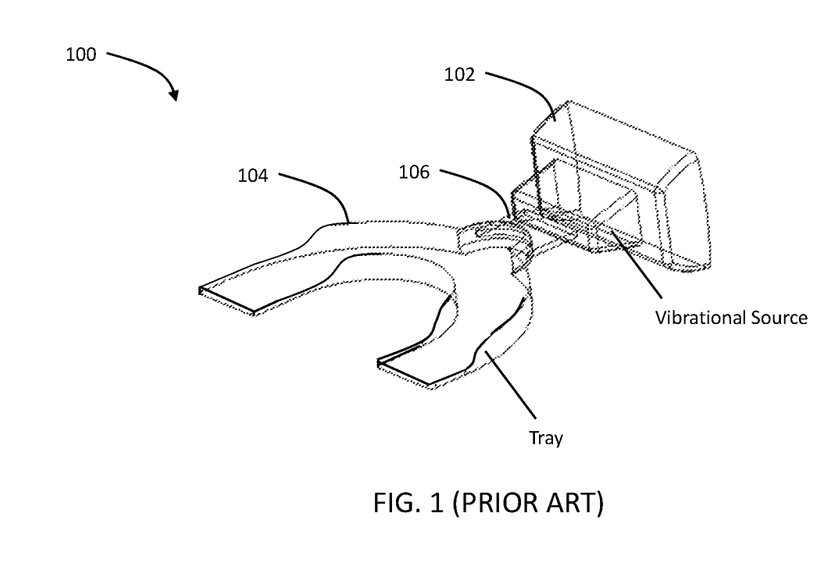
FIG. 1 is a perspective view of a vibrational force device with a tray as used in the prior art.

FIG. 1 illustrates one embodiment of an orthodontic vibrational device 100 for accelerating orthodontic tooth movement. The device 100 includes a vibrational source 102 with controllable frequency and intensity and a generic tray 104. In one example, the tray 104 is attached to the vibrational source through an interface 106 that allows the tray 104 to be removed, replaced, or fixed. The tray 104 can be fixed or adjustable so that it is compatible with different kinds of vibrational sources 102. Either the vibrational source 102 or the tray 104 contains mechanisms to lock the interface that provides sufficient strength and stiffness to deliver the vibrational stimulation. In another example, the tray 104 is attached to the vibrational source 102 permanently, thereby eliminating the interface 106. As seen in FIG. 1, the tray is flat or has folds with equal heights and is thus unable to provide patient-selective transmission of vibrational force to teeth of different height as shown in FIG. 2a.

Referring to FIG. 2a, a schematic of three teeth (separated from one another for demonstration purposes) is shown with the tray 104 in firm contact with tooth number 3, in slight contact with tooth number 2 and free of contact with tooth number 1. Suppose, tooth number 1 requires to be treated (moved). Because of the spacing between the tray 104 and the tooth (number 3), no vibrational forces will be transmitted to the tooth. This lack of vibrational force (VF) is seen in the graph above tooth number 1. Referring to FIG. 2b, the same three teeth of FIG. 2a are shown, however, this time the tray 104 is changed to provide the proper surface for tooth number 1. As a result, the VF force on tooth number 1 changes as shown in the VF force graph provided above the tooth.

Figure 3:
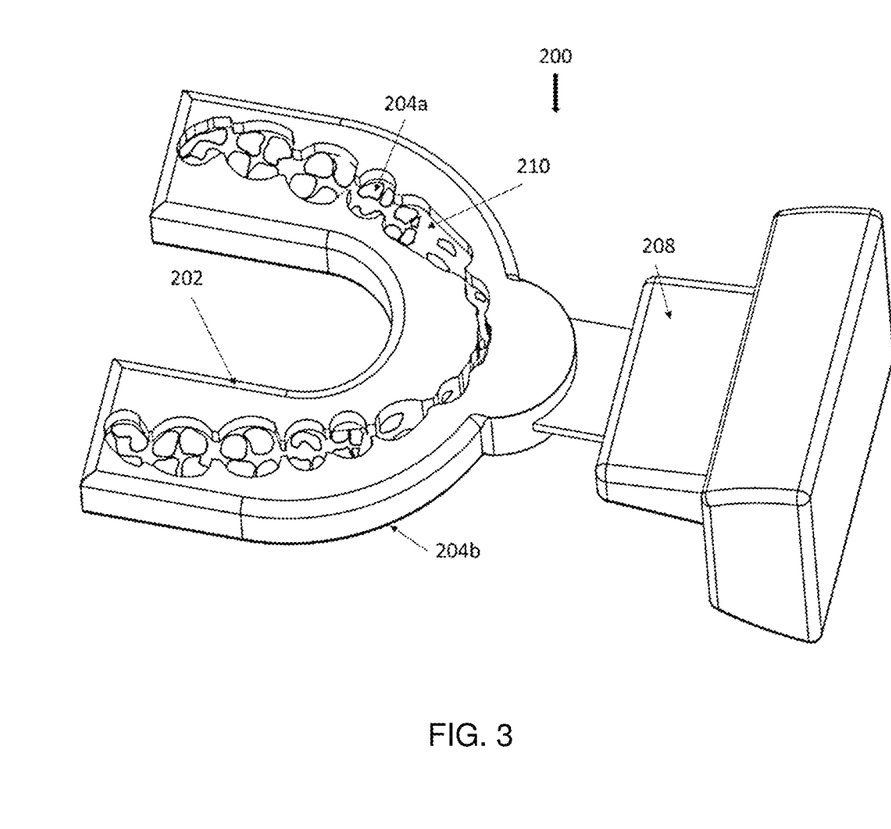
FIG. 3 is a sketch of one embodiment of the patient-specific tray as described herein to deliver the vibrational force to the teeth that are intended to be stimulated.
Figure 4:
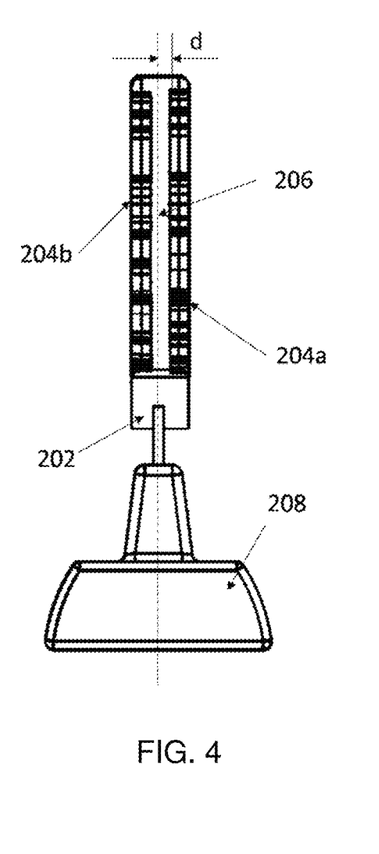
FIG. 4 is a sketch of one embodiment of the patient-specific tray as described herein to deliver the vibrational force to the teeth that are intended to be stimulated and allow teeth to move into one or plurality of grooves during the treatment and to remain therein to be stimulated.

FIGS. 3 and 4 illustrate a perspective view and a top view of one embodiment of a new patient-specific tray assembly 200 for a patient, respectively, according to the present disclosure. The tray assembly 200 includes a tray 202 which includes an upper surface 204a that is defined by the patient's upper teeth profile and a lower surface 204b defined by the patient's lower teeth profile on the lower surface 204b in occlusal position obtained from the patient's dental records such as three-dimensional images from Computed Tomography, occlusal registration, intra oral scanner, or impression. The upper surface 204a and the lower surface 204b establish a profile which is engraved into the upper and lower surfaces. In FIG. 3, similar to FIG. 1, an optional interface 208 is shown between the tray 202 and a vibrational source (not shown).

The upper surface 204a is defined by the patient's upper teeth profile and the lower surface 204b is defined by lower teeth profile in occlusal position. The tray 202 is also defined by a center plane 206. There is a distance, d, between the tooth profile and the tray's center plane 206. The distance between individual tooth's profile and center plane may be modified for controlling the level of stimulation. The level of stimulation is characterized by the vibrational force's peak load plus a preload. The preload is controlled by the distance between the tooth's crown and the center plane 206. For the teeth not intended to be stimulated, the contact between the teeth and the tray 202 will be removed. For the teeth to be stimulated and to receive higher level of stimulation, the preload on the crowns will be added by increasing the distance, d. For the teeth to be stimulated and to receive lower level of stimulation, the preload will be reduced, eliminated, or by introducing clearance. The control of the level of the stimulation on individual tooth can be accomplished by adjusting the distance, d, between the crown and the center plane 206 of the tray 202, which can be accomplished by adding or subtracting a layer of material in between. The adjustment can be for an individual or a plurality of teeth to be stimulated based on the treatment plan. The tray will be attached to the vibrational source (not shown) through the interface 208.

The patient-specific tray 200 in FIG. 3 is customized for the patient to accommodate tooth movement during the treatment based on the intended directions prescribed. The tray 202 also has grooves 210, which originate from initial positions of the teeth's crown profiles on the tray 202 in the direction of the tooth movement parallel to the occlusal plane based on a clinician's intention. The grooves will be wide enough to accommodate possible tooth displacement deviations. When a tooth moves into the grooves 210, it will maintain its contact with the tray while being stimulated. After the tray 202 is finalized based on the desired level of stimulation, a groove 210 or a plurality of grooves 210 will be added to the tray 202 to ensure that the teeth to be moved can move into the grooves 210 for continuously delivery of the desired level of stimulation. During the treatment the moving teeth may intrude or extrude. In case the peak load needs to be adjusted due to the tooth's intrusion or extrusion, a layer of the materials, such as silicon, can be added to the bottom of the groove for intruded tooth or a layer of the material at the bottom of the groove can be removed for the extruded tooth to maintain the same level of stimulation or to adjust the level of stimulation based on the clinical needs. The thickness of the addition or removal can be computed or experimentally obtained.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible.

What is claimed is:

1. A device for accelerating tooth movement during an orthodontic treatment, comprising:
   a subject-specific tray configured to receive vibrational force from a vibrational source and placed in an occlusion position between a subject's upper and lower teeth, and further configured to selectively transmit and distribute a vibrational stimulation associated with the vibrational force to teeth that are intended to be stimulated;
   the subject-specific tray is configured to have the subject's upper and lower occlusal profiles in their occlusal positions engraved onto the subject-specific tray surfaces, to thereby ensure contacts of the subject's upper and lower teeth to the subject-specific tray when the subject's teeth are aligned to the subject's upper and lower occlusal profiles;
   wherein the subject-specific tray further includes one or more grooves pre-formed therein prior to insertion into mouth of the subject and configured to allow displaced teeth to remain stimulated during the orthodontic treatment, which i) originate from initial positions of the subject's upper and lower occlusal profiles in a direction of tooth movement parallel to an occlusal plane based on a predetermined plan; and ii) are wide enough to accommodate possible tooth displacement deviations; and further configured to maintain contact with a tooth and thereby maintain stimulation of the tooth when the tooth moves into one of the one or more grooves, and wherein the one or more grooves further allow adjusting intensity of the vibrational stimulation by adding or subtracting layers of materials to bottom surfaces of the grooves.

* * * * *